US012775123B2

(12) United States Patent
He et al.

(10) Patent No.: US 12,775,123 B2
(45) Date of Patent: Oct. 27, 2026

(54) FRESNEL LENS AND A LAMP CONTAINING IT

(71) Applicants: Self Electronics Co., Ltd., Ningbo (CN); Wanjiong Lin, Ningbo (CN); Self Electronics USA Corporation, Norcross, GA (US)

(72) Inventors: Zuping He, Ningbo (CN); Xiaoyun Liu, Ningbo (CN); Jun Yang, Ningbo (CN); Sheng Zhang, Ningbo (CN); Kai Xu, Ningbo (CN); Jianguo Dong, Ningbo (CN); Huangfeng Pan, Ningbo (CN)

(73) Assignee: Self Electronics Co., Ltd., Ningbo City (CN)

( * ) Notice: Subject to any disclaimer, the term of this patent is extended or adjusted under 35 U.S.C. 154(b) by 580 days.

(21) Appl. No.: 18/463,892

(22) Filed: Sep. 8, 2023

(65) Prior Publication Data

US 2024/0085595 A1 Mar. 14, 2024

(30) Foreign Application Priority Data

Sep. 9, 2022 (CN) ......................... 202211101061.8

(51) Int. Cl.
*G02B 3/08* (2006.01)
*F21V 5/04* (2006.01)
*G02B 19/00* (2006.01)

(52) U.S. Cl.
CPC ................ *G02B 3/08* (2013.01); *F21V 5/045* (2013.01); *G02B 19/0009* (2013.01)

(58) Field of Classification Search
CPC ........ G02B 3/08; G02B 19/0009; F21V 5/045
See application file for complete search history.

(56) References Cited

U.S. PATENT DOCUMENTS

| | | | | |
|---|---|---|---|---|
| 6,407,860 | B1 * | 6/2002 | Funazaki | G02B 3/08 359/743 |
| 7,061,677 | B2 * | 6/2006 | Lee | G02B 3/08 359/457 |
| 7,618,161 | B2 * | 11/2009 | Morino | F21V 5/045 359/743 |
| 2008/0106804 | A1 * | 5/2008 | Ieda | G02B 3/08 359/708 |
| 2016/0363288 | A1 * | 12/2016 | McKendry | F21V 5/045 |
| 2018/0074323 | A1 * | 3/2018 | Wheelwright | G02B 3/08 |
| 2019/0079217 | A1 * | 3/2019 | De Lamberterie | F21S 41/275 |
| 2019/0250310 | A1 * | 8/2019 | Lin | G02B 3/08 |

FOREIGN PATENT DOCUMENTS

| | | | | |
|---|---|---|---|---|
| WO | WO-2018052493 | A1 * | 3/2018 | G02B 27/42 |

* cited by examiner

*Primary Examiner* — Nicholas R. Pasko
(74) *Attorney, Agent, or Firm* — Wang Law Firm, Inc.

(57) ABSTRACT

A Fresnel lens in a lens body, the lens body is provided with a light incident surface and a light exit surface opposite to each other along a first direction, and the light exit surfaces are adjacently arranged in a second direction perpendicular to the first direction. There are several protruding teeth, and the protruding teeth are formed by an effective surface and an ineffective surface, and the ineffective surface is inclined at an acute angle relative to the first direction. The invention makes the light passing through the lens body reach the effective surface as much as possible, thereby reducing stray light and enhancing light efficiency.

9 Claims, 8 Drawing Sheets

(a)
PRIOR ART (b)

FRESNEL LENS AND A LAMP CONTAINING IT

TECHNICAL FIELD

The invention relates to the field of lamps, in particular to a Fresnel lens and a lamp containing the same.

BACKGROUND

The Fresnel lens is evolved from the plano-convex lens (or aspherical lens). It essentially removes the parts of the original lens that have no effect on the change of lens curvature, leaving only those parts that can effectively refract.

When the ordinary Fresnel lens is directly applied to the LED lighting distribution, part of the light between the Fresnel micro-unit lenses will enter the adjacent unit, resulting in a relatively large angle of light for this part, which is easier to form stray light. As shown in FIG. 1, those surfaces that cannot effectively refract in common Fresnel lenses (that is, the ineffective surfaces) are parallel to the optical axis, and the light is affected by the edge refraction of the ineffective surfaces, and the adjacent effective refraction surfaces are at a large angle scattering out affects the uniformity of the light.

Therefore, those skilled in the art are devoting themselves to developing a novel Fresnel lens and related lamps to reduce stray light and make the lamps emit more uniform light.

SUMMARY OF THE INVENTION

In view of the above-mentioned defects of the prior art, the technical problem to be solved by the present invention is the stray light problem of the existing Fresnel lens.

In order to realize the above purpose, the present invention provides a Fresnel lens, including a lens body, with the optical axis direction as the first direction, the lens body is provided with a light incident surface and a light exit surface opposite to each other along the first direction, and the light emitted from the light source is refracted through the light incident surface and penetrated into the lens body, and then refracted to the outside through the light exit surface, wherein in the second direction perpendicular to the first direction, the light exit surface is equipped with a number of protruding/convex teeth next to each other. The protruding teeth are formed by an effective surface and an ineffective surface, the effective surface being adapted to refract the light to the outside of the lens body, and the ineffective surface being provided at an acute angle to the first direction;

For a first protruding tooth and a second protruding tooth adjacent to each other on the light exit surface, the first protruding tooth includes a first effective surface and a first ineffective surface, the second protruding tooth includes a second effective surface and a second ineffective surface, and the first ineffective surface and the second effective surface intersect to form a first valley point;

For the first light ray (L1) exiting from the light source and arriving at the first valley point via the light incident surface, the first light ray (L1) forms a first angle ($\alpha$) with respect to the first direction, the first ineffective surface forms a third angle ($\theta$) with respect to the first direction, and the first light ray (L1) exiting the first valley point via the first valley point (L1') forms a fourth angle ($\gamma$) with respect to the first direction, and then the third angle ($\theta$) is set in size between the first angle ($\alpha$) and the fourth angle ($\gamma$).

Further, for the above Fresnel lens, the following parameters are defined,

The second effective surface forms a second included angle ($\beta$) with respect to the second direction, The refractive index of the lens body is n, and $n>1$, The first ineffective surface forms a third included angle ($\theta$) relative to the first direction, then the third included angle ($\theta$) satisfies the following relationship:

When $\alpha \geq \beta$, $$\alpha \leq \theta \leq \beta + \arcsin[n \sin(\alpha-\beta)]; \text{or}$$

When $\alpha<\beta$, $$\beta + \arcsin[n \sin(\alpha-\beta)] \leq \theta \leq \alpha.$$

Optionally, the third included angle ($\theta$) satisfies the following relationship:

$$\theta = \beta + \arcsin[n \sin(\alpha-\beta)].$$

In another embodiment of the present invention, the third included angle ($\theta$) is equal to the first included angle ($\alpha$).

Further, along the direction away from the optical axis, the angles between the effective surfaces of each protruding tooth on the light exit surface relative to the second direction gradually change. At the same time and further, along the direction away from the optical axis, the angles between the ineffective surfaces of each protruding tooth on the light exit surface relative to the first direction gradually change.

In one embodiment of the present invention, along the direction away from the optical axis, the angle between the effective surface of each protruding tooth on the light exit surface relative to the second direction gradually increases gradually. At the same time and further, along the direction away from the optical axis, the angle between the ineffective surface of each protruding tooth on the light exit surface relative to the first direction gradually increases or furthermore, along the direction away from the optical axis, the angle of the ineffective surface of each of the protruding teeth of the light exit surface relative to the first direction increases asymptotically in sequence.

Preferably, each protruding tooth on the light exit surface is arranged symmetrically with respect to the optical axis.

Preferably, the light incident surface is a surface, and the light incident surface is arranged perpendicular to the optical axis.

In addition, the present invention also provides a lamp using the above-mentioned Fresnel lens, including:

Fresnel lens;

The light source is located on the optical axis and is arranged on the side of the Fresnel lens close to the light incident surface.

Furthermore, the above-mentioned lamp is in a long strip shape, the light source is linearly distributed along a third direction, the third direction is perpendicular to the first direction and the second direction, and the Fresnel lens is stretched along the third direction.

Technical Effect

The Fresnel lens of the present invention sets the inclination angle of the ineffective surface of the protruding teeth to prevent most of the light from passing through, so that the light passing through the lens body reaches the effective surface as much as possible, thereby reducing stray light and enhancing Light effect.

The concept, specific structure and technical effects of the present invention will be further described below in conjunction with the accompanying drawings to fully understand the purpose, features and effects of the present invention.

100 lens body, 1 light incident surface, 2 light exit surface, 21 protruding/convex tooth, 211 effective surface, 212 ineffective surface, 22 first protruding tooth, 221 first effective surface, 222 first ineffective surface, P first peak point, O first valley point, 23 second protruding tooth, 231 second effective surface, 232 second ineffective surface, 3 light sources, DO optical axis, D1 first direction, D2 second direction, D3 third direction, L1 the first light ray, L2 the second ray, L3 third ray, L4 fourth ray, L1' first exiting ray, L2' second exiting ray, L3' third exiting ray, α first included angle, β the second included angle, θ the third included angle, γ the fourth included angle.

DETAILED DESCRIPTION OF THE DRAWINGS

Figure 1:
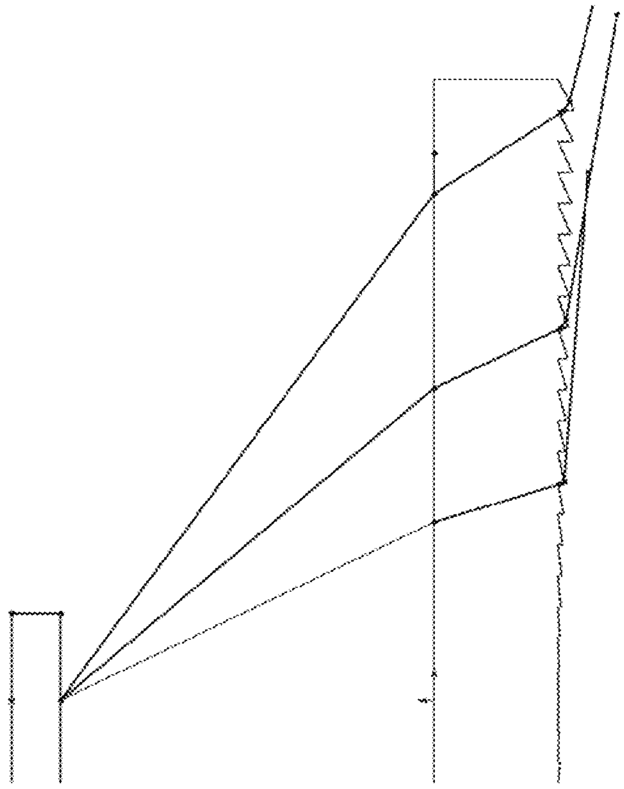
Fig. 1 PRIOR ART
FIG. 1 is a schematic diagram of an optical path of a common Fresnel lens in the prior art.
Figure 2:
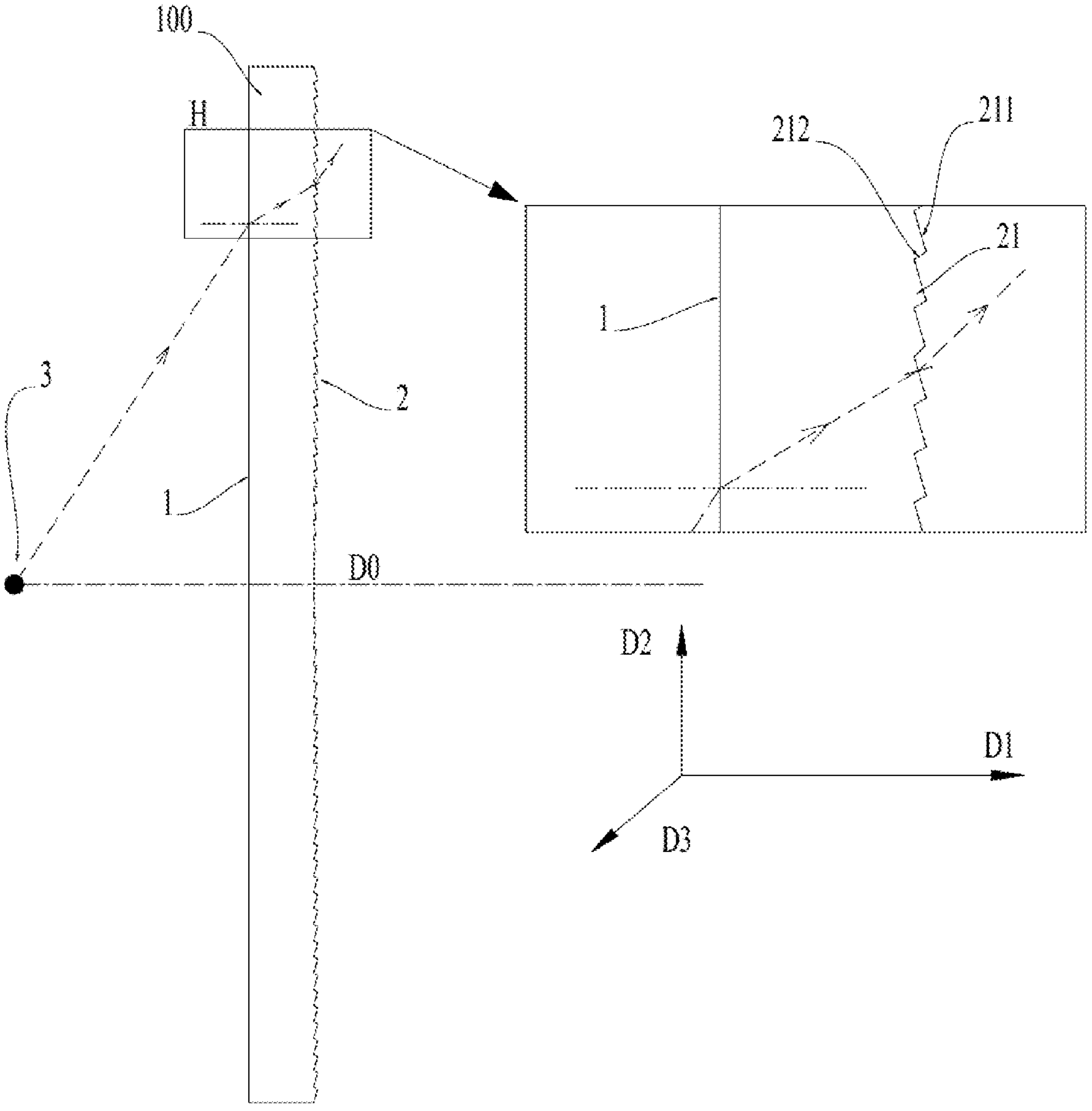
FIG. 2 is a schematic structural view of the Fresnel lens of the present invention and a partially enlarged view at H.

As shown in FIG. 2 is a Fresnel lens provided by the present invention, which includes a lens body 100, a longitudinal cross-section of the lens body 100 is shown in FIG. 2, which contains an optical axis D0 of the lens body 100, and the direction in which the optical axis D0 is located is defined as a first direction D1, and the lens body 100 is disposed with an incident surface 1 and a light exit surface 2 opposite to each other in the first direction D1, and a light source 3 is relatively close to one side of the incident surface 1, and light emitted from the light source 3 is refracted through the incident surface 1 into the lens body 100 and then refracted to the outside through the light exit surface 2. The light source 3 is relatively close to the side of the light incident surface 1, and the light emitted from the light source 3 is refracted through the light incident surface 1 into the lens body 100 and then refracted to the outside through the light exit surface 2.

In the second direction D2 perpendicular to the first direction D1, several protruding teeth 21 are adjacently arranged on the light exit surface 2. The protruding teeth 21 are formed by an effective surface 211 and an ineffective surface 212. The effective surface 211 is the Fresnel lens. For the part capable of effective refraction, the effective surface 211 is suitable for refracting light out of the lens body 100, and the ineffective surface 212 is transitionally connected between each effective surface 211, and the effective surface 211 and the ineffective surface 212 alternately constitute the light exit surface 2.

In the prior art, each ineffective surface 212 is generally parallel to the first direction D1. However, in the embodiment of the present invention, the ineffective surface 212 forms an included angle with the first direction D1 at an acute angle.

Regarding the adjacent first protruding teeth 22 and the second protruding teeth 23 on the light exit surface 2, the first protruding teeth 22 include a first effective surface 221 and a first ineffective surface 222, and the second protruding teeth 23 include a second effective surface 231 and a first ineffective surface 222. The second ineffective surface 232, the first effective surface 221 and the first ineffective surface 222 intersect to form a first peak point P, and the first ineffective surface 222 and the second effective surface 231 intersect to form a first valley point O.

Regarding the above structure, in the technical solution of the present invention, the first ineffective surface 222 forms an acute angle with the first direction D1 and is tilted/inclined within the angle range formed between the first light ray L1 and the light emitted from the first light ray L1 through the first valley point O or is inclined to be provided within the angle formed between the first light ray L1 and the exiting ray of the first light ray L1 via the first valley point O.

Figure 3:
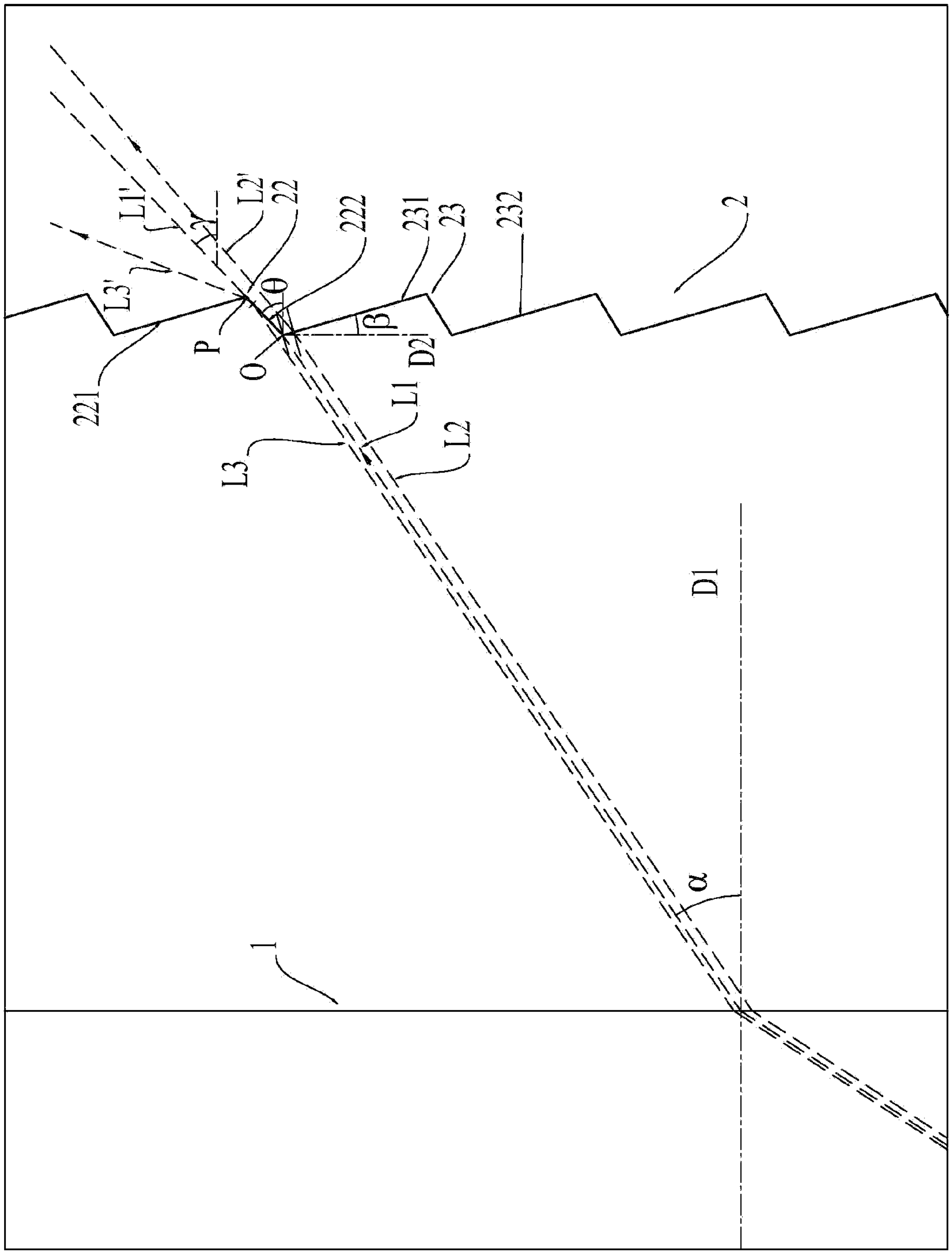
FIG. 3 is a schematic structural view of an inactive surface in an embodiment of the Fresnel lens of the present invention.

In the design of the present invention, as shown in FIG. 3, for the first light ray L1 exiting from the light source 3 via the incident light surface 1 to reach the first valley point O, the first light ray L1 forms a first angle α with respect to the first direction D1, the first ineffective surface 222 forms a third angle θ with respect to the first direction D1, and the first light ray L1' of the first light ray L1 via the first valley point O forms a fourth angle γ with respect to the first direction D1, then the size of the third angle θ is set between the first angle α and the third angle γ. forming a fourth included angle γ, then the size of the third included angle θ is set between the first included angle α and the fourth included angle γ.

In this embodiment, the position of the first invalid surface 222 depends on the angle at which the first light ray of light passes through the first valley point O in the lens body 100 and the angle of the refracting surface at the time of refraction at the first valley point O. The setting of the first invalid surface 222 is illustrated in conjunction with FIG. 3.

In one embodiment as shown in FIG. 3, the first light ray L1 is refracted by the second effective surface 231 at the first valley point O and becomes the first exiting light ray L1'. The first ineffective surface 222 is configured to be in contact with the first exiting ray. L1' is coplanar, that is to say, the third included angle θ formed by the first ineffective surface 222 with respect to the first direction D1 is the same as the included angle θ of the first exiting light ray L1' with respect to the first direction D1.

The implementation process of reducing stray light on the first ineffective surface will be further described below.

In the Fresnel lens, for a light source 3 at a given position, the light emitted by the light source 3 will sweep across an angular range. For example, as shown in FIG. 3, after refraction from the light source 3 through the incident light surface 1, there are adjacent first light ray L1, second light ray L2 and third light ray L3 arrive at the light exit surface 2. Among them, the first light ray L1 reaches the first valley point O; the angle between the second light ray L2 and the first direction D1 is smaller than the first angle α between the first light ray L1 and the first direction D1, so the second light ray L2 is smaller than the first angle α. The light ray L1 is closer to the optical axis D0 and reaches the second protruding tooth 23 adjacent to the first valley point O; the angle between the third light ray L3 and the first direction D1 is greater than the angle between the first light ray L1 and the first direction D1. The angle α is included, so the third light ray L3 is farther from the optical axis D0 than the first light ray L1 and reaches the first protruding tooth 22 adjacent to the first valley point O.

The third included angle θ formed by the first ineffective surface 222 with respect to the first direction D1 is the same as the included angle of the first exiting light L1' with respect to the first direction D1, and the first exiting light L1' passes through the first ineffective surface 222; The second light ray L2 is on the near optical axis D0 side of the first light ray L1, after refraction along the second effective surface 231, the formed second exiting light L2' is located on the near optical axis D0 side of the first exiting light L1', and thus does not pass through the first ineffective surface 222; the third ray L3 is on the side away from the optical axis D0 of the first light ray, and if it is closer to the first light ray L1, it will reach the first ineffective surface 222, and the third ray L3 will reach the first ineffective surface 222. The three light rays L3 mainly produce total reflection, and the light after total reflection is refracted on the first effective surface 221 and passes out as the third exiting light L3'. In this case, the exiting angle of the third exiting light L3' by the first effective surface 221 and the adjusting of the first ineffective surface 222, on the one hand, the light reaching the first ineffective surface 222 is reduced, and on the other hand, the exit angle of the third exiting light L3' is eased, thereby reducing stray light.

Figure 4:
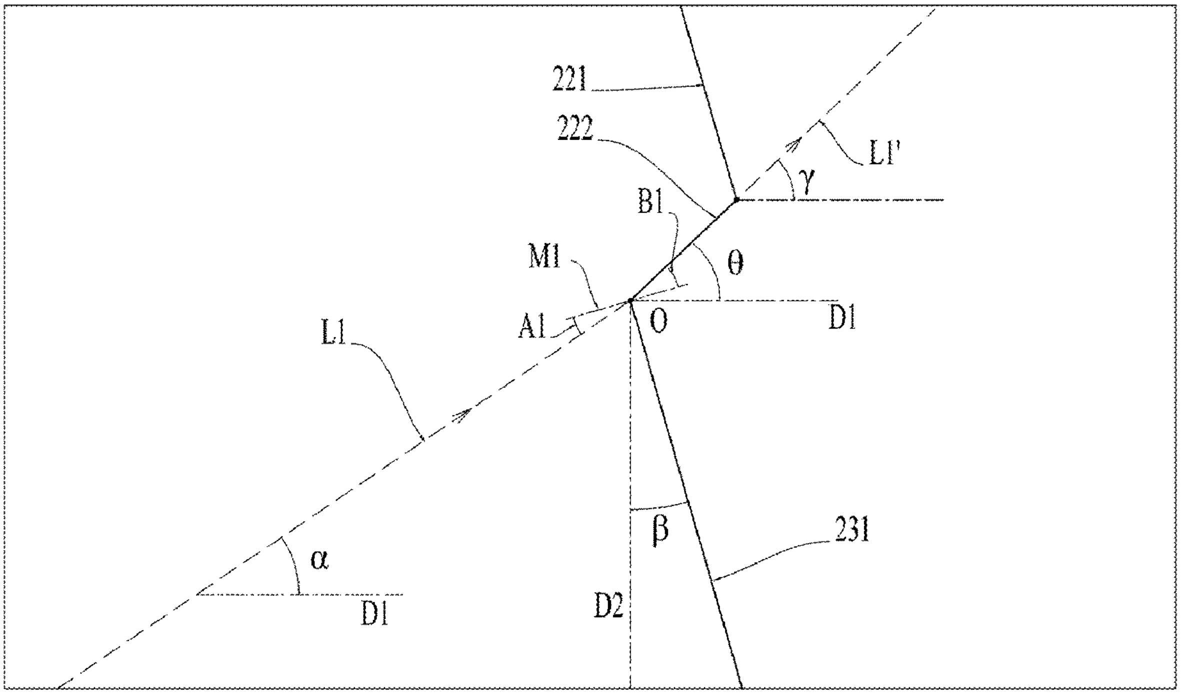
FIG. 4 is a schematic diagram of the optical path relationship according to FIG. 3.

According to the above-described embodiment, the first ineffective surface is defined by the following parameters:

As shown in FIG. 3 and FIG. 4, the angle between the first light ray L1 and the first direction D1 after penetrating the lens body 100 is the first angle α, the angle between the second effective surface 231 and the second direction D2 is the second angle β, and the angle between the second effective surface 231 and the second direction D2 is the second angle β. An ineffective surface 222 extends from the first valley point O to intersect the first effective surface 221 at a third angle θ with the first direction D1, and the intersection point is the first peak point P;

In the lens body 100, the normal of the second effective surface 231 is M1, and the incident angle of the first light ray L1 relative to the normal M1 is A1. According to the geometric relationship, there is: A1=α−β;

It can be obtained from FIG. 4 that when α>β, the first light ray L1 is on the lower side of the normal M1, that is, the side close to the optical axis D0;

The refraction angle of the first light ray L1 refracted through the second effective surface 231 is B1, the refractive index of the lens body 100 is n, and when the external medium of the lens is air, n>1, so according to the refraction relation:

n sinA1=sinB1; the size of the refraction angle B1 can be deduced accordingly;

The angle between the refracted first exiting light L1' and the first direction D1 is the fourth angle γ, which can be obtained according to the geometric relationship:

$$\gamma=\beta+B1;$$

Then according to the calculation, the fourth included angle γ satisfies the following relationship:

$$\gamma=\beta+\arcsin[n\ \sin(\alpha-\beta)];$$

when the included angle formed by the first ineffective surface 222 relative to the first direction D1, that is, the third included angle θ, is equal to the fourth included angle γ, generation of stray light can be significantly reduced.

At this time, the size of the third included angle θ is limited to:

$$\theta=\beta+\arcsin[n\ \sin(\alpha-\beta)].$$

In particular, when the first included angle α and the second included angle 3 are equal, the third included angle θ is set as θ=α=β.

Figure 5:
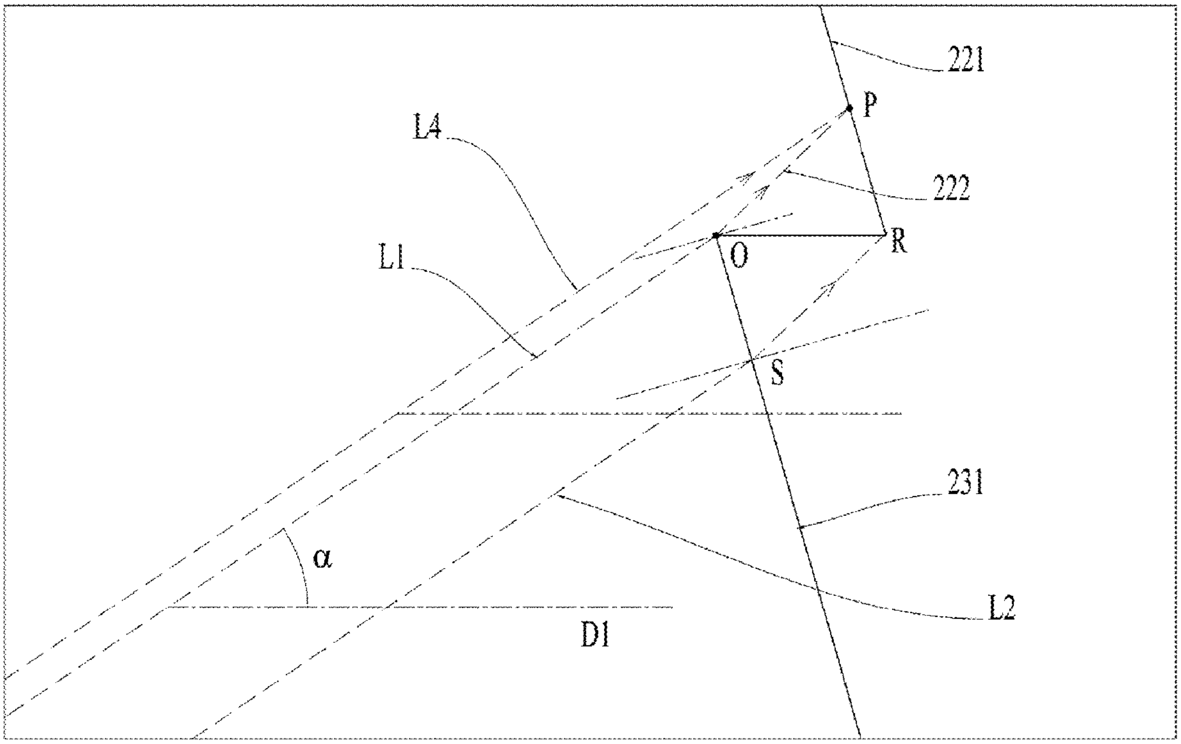
Fig. 5 PRIOR ART
FIG. 5 is a structural diagram and optical path of the Fresnel lens of the prior art.

As shown in FIG. 5, the structure of the Fresnel lens of the prior art is shown as a comparison to illustrate the effect of the structure of the Fresnel lens of the present invention on reducing stray light.

As shown in FIG. 5, the Fresnel lens in the prior art generally excavates the part of the original lens that has no effect on the lens curvature change, and only keeps those parts that can effectively refract, so its ineffective surfaces are aligned with the optical axis D0 in the parallel direction, that is, the first direction D1 is set, as shown in the OR section shown in FIG. 5, and the triangle OPR is an extra part of the Fresnel lens in the prior art compared with the Fresnel lens of the present invention. The first light ray L1 passes through the first valley point O and the first peak point P, the second ray L2 is refracted through the second effective surface 231 to reach point R, and the fourth ray L4 is parallel to the first light ray L1 and passes through the lens body 100 and reaches the first peak point P. By comparison, it can be found that when the inclined direction of the first ineffective surface 222 is set to be equal to the exiting direction of the first light ray L1 after passing through the first valley point O, the first ineffective surface 222 only allows the light rays in the range between the first light ray L1 and the fourth ray L4 to pass through the first ineffective surface 222; compared with the prior art Fresnel lens, the stray light caused by the light rays passing through the OS segment in the original invalid surface is reduced, and the angle between the light rays and the invalid surface is reduced, and the exit angle of the generated stray light also has a moderating effect.

Figure 6:
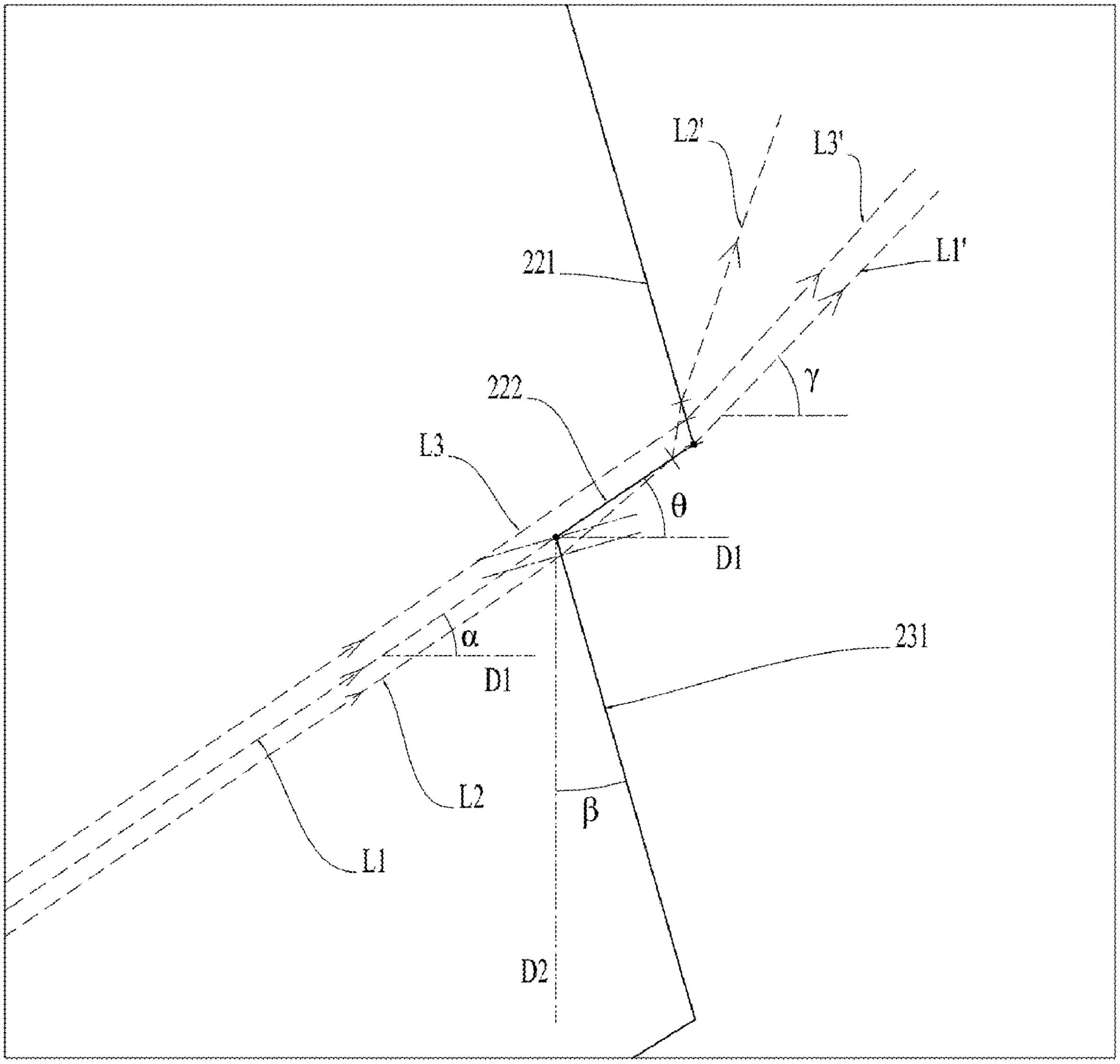
FIG. 6 is a schematic structural diagram of the ineffective surface of another embodiment of the Fresnel lens of the present invention.

As shown in FIG. 6, an embodiment of another arrangement of the Fresnel lens of the present invention is given. The difference from the embodiment shown in FIG. 4 is that the first ineffective surface 222 is inclined from the first valley point O, and the third included angle θ formed with respect to the first direction D1 is equal to the first included angle α of the first light ray L1, i.e., 0=a. The first light ray L1 passes through the lens body 100 and is refracted on the first effective surface 221.

According to the setup of the present embodiment, for the first light ray L1 and the second light ray L2 and the third light ray L3 adjacent thereto: the angle between the third light ray L3 and the first direction D1 is greater than the first angle α between the first light ray L1 and the first direction D1, so that the third light ray L3 is further away from the optical axis D0 than the first light ray L1, both the first light ray L1 and the third light ray L3 pass through the lens body 100 in a straight line and reach the first effective surface 221 after refraction; the angle between the second light ray L2 and the first direction D1 is smaller than the first angle α between the first light ray L1 and the first direction D1, so the second light ray L2 is nearer to the optical axis D0 than the first light ray L1, and arrives at the second protruding tooth 23 adjacent to the first valley O, and is refracted through the second effective surface 231, and when the second light ray L2 is nearer to the first light ray L1, it will be refracted through the first effective surface 222 to pass through the first protruding tooth 22 and then refracted out.

Therefore, according to the arrangement of this embodiment, due to the inclined setting of the first ineffective surface 222, the light rays near the first valley point O form a smaller angle with the first ineffective surface 222, and the range of light passing through the first ineffective surface 222 is greatly reduced, thereby reducing the generation of stray light.

Further, in conjunction with the embodiment of FIGS. 4 and 6, the third angle θ formed by the first invalid surface 222 with respect to the first direction D1 is set between the fourth angle γ of the first exiting ray and the first angle α of the first light ray L1 with the first direction, i.e.

$$\beta \le \theta \le \beta + \arcsin[n \sin(\alpha - \beta)];$$

Based on the above settings, if the third angle θ formed by the first ineffective surface 222 relative to the first direction D1 is set too large, more light rays inside the lens body 100 will be totally reflected on the first ineffective surface 222, and if the third angle θ is set too small, more light will pass through the second effective surface 231 and then pass through the first ineffective surface 222 to be totally reflected inside the lens, all of which will lead to an increase in stray light.

According to the Fresnel lens set up above, for the light emitted from the light source, by arranging each ineffective surface to be inclined relative to the first direction D1, the range of the light received by each ineffective surface is reduced, and the influence of stray light can be significantly reduced.

Figure 7:
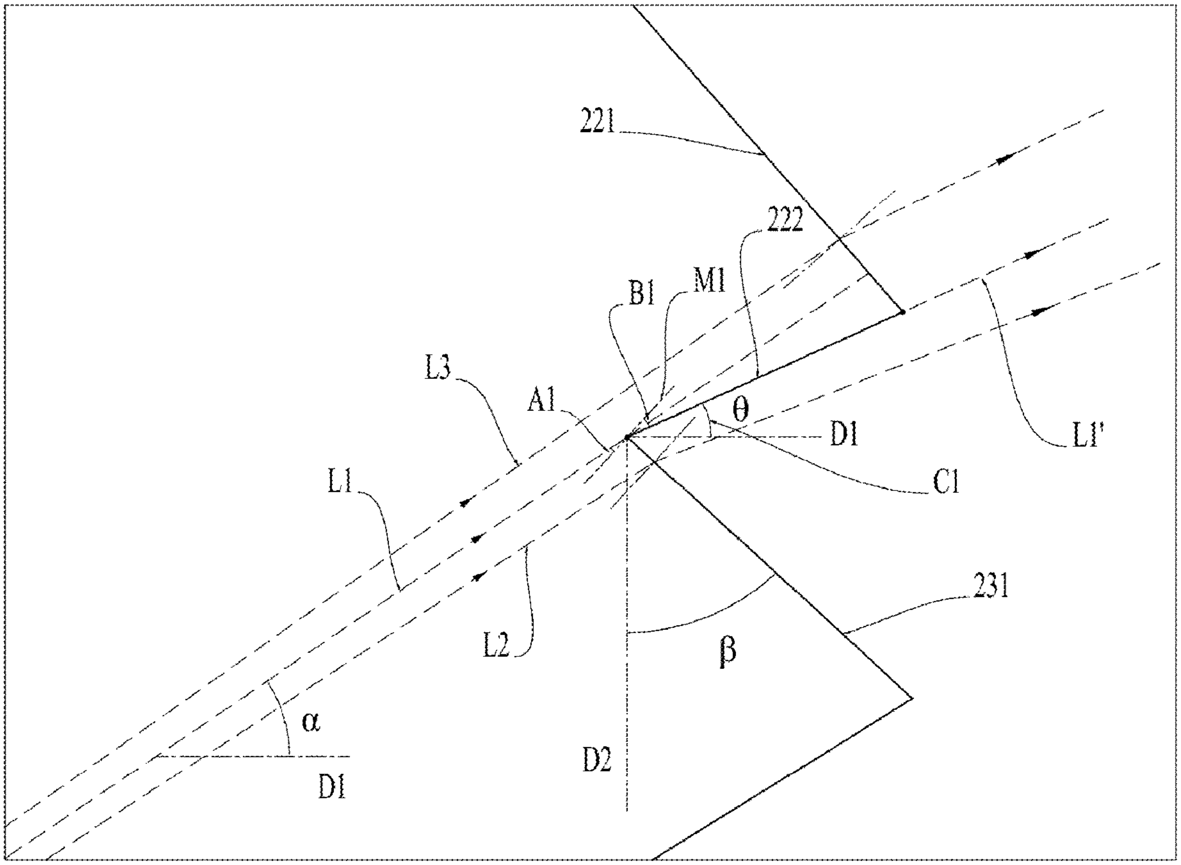
FIG. 7 is a schematic structural diagram of the ineffective surface of another embodiment of the Fresnel lens of the present invention.

An embodiment of an alternative setting of the Fresnel lens of the present invention is given as shown in FIG. 7. Different from the embodiment shown in FIG. 4 is the shape of the protruding tooth, when the first angle α<the second angle β, and the first invalid surface 222 accordingly set up is varied.

The incident angle of the first light ray L1 in the lens body 100 relative to the normal line M1 is A1=β−α, the refraction angle of the first exiting light ray L1' after refraction is B1, and the angle between the first exiting light ray L1' and the first direction D1 is the fourth included angle γ=β−B1; similarly:

$$\gamma = \beta + \arcsin[n \sin(\alpha - \beta)].$$

The first light ray L1 and the adjacent second ray L2 and the third ray L3: the first light ray L1 reaches the first valley point O and is refracted as the first exiting ray L1'; the second ray L2 and the first direction D1 has an angle smaller than the first angle α between the first light ray L1 and the first direction D1, so the second light ray L2 is closer to the optical axis D0 than the first light ray L1 and reaches the second protruding tooth 23 adjacent to the first valley point O. After being refracted by the second effective surface 231 and passing through, the second exiting ray L2' is closer to the optical axis D0; the angle between the third ray L3 and the first direction D1 is greater than an included angle α between the first light ray L1 and the first direction D1, and therefore the third light ray L3 is farther from the optical axis D0 than the first light ray L1 and reaches the first protruding tooth 22 adjacent to the first valley point O. The third light ray L3 passes through the lens body 100 in a straight line. After reaching the first effective surface 221, it is refracted and then passes out.

Accordingly, the first ineffective surface 222 is inclined from the first valley point O, and the first ineffective surface 222 is provided between the first outgoing light ray L1' and the third light ray L3 which passes through the lens body 100 in a straight line, so that passage of the respective light rays through the first ineffective surface 222 is avoided, and thus stray light generation is greatly reduced.

Thus as preferably, the third angle θ formed by the first ineffective surface 222 with respect to the first direction D1 is set between the fourth angle γ of the first exiting ray L1' and the first angle α of the first light ray L1 with the first direction D1, i.e.

$$\beta + \arcsin[n \sin(\alpha - \beta)] \le \theta \le \alpha.$$

Therefore, for any adjacent first protruding tooth 22 and second protruding tooth 23 in the Fresnel lens provided by the present invention, the first ineffective surface 222 of the first protruding tooth 22 is based on the above-mentioned first angle α and the second protruding tooth. The second included angle β is set, and the third included angle θ formed by the first ineffective surface 222 relative to the first direction D1 is set between α and β+arcsin[n sin(α−β)].

In another optional embodiment of the present invention, the third included angle θ is set according to the following relationship θ=β+arcsin[n sin(α−β)].

In another optional embodiment of the present invention, the third angle θ is equal in magnitude to the first angle α, i.e., for each of the tooth 21 distributed along the second direction D2, the third angle θ between the ineffective surface 212 of each of the tooth 21 and the first direction D1 is set asymptotically according to the angle of the light ray arriving at the valley point of that tooth 21.

Further, along the direction away from the optical axis D0, the included angle of the effective surface of each protruding tooth 21 of the light exit surface 2 relative to the second direction D2 gradually increases; accordingly, along the direction away from the optical axis D0, the angle of the ineffective surface 212 of each of the protruding tooth 21 of the light exit surface 2 relative to the first direction D1 is gradually increased. This setting allows light from the light source 3 on the optical axis D0 to be distributed on the light exit surface 2 as much as possible, while reducing the amount of light passing through the ineffective surface 212.

In another embodiment of the present invention, the Fresnel lens has a symmetrical structure, and each protruding tooth 21 on the light exit surface 2 is arranged symmetrically with respect to the optical axis D0. And preferably, the light incident surface 1 is a surface, and the light incident surface 1 is arranged perpendicular to the optical axis D0.

Figure 8:
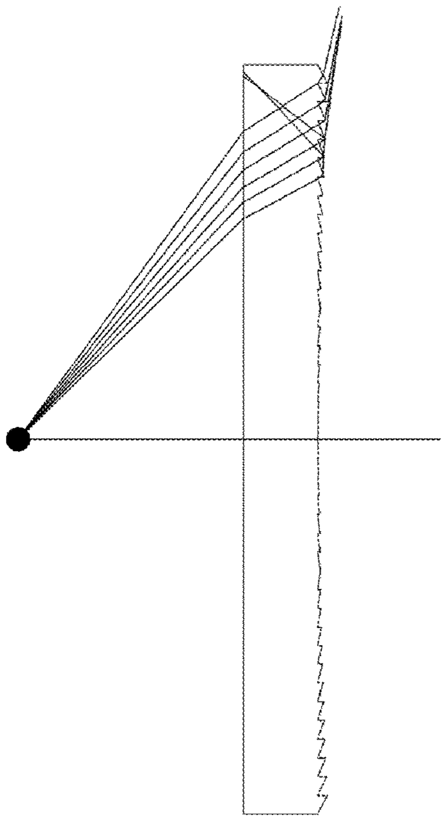
FIG. 8 is a comparison diagram of the optical paths of the Fresnel lens of the present invention and the Fresnel lens of the prior art. (a) is the Fresnel lens of the prior art, and (b) is the Fresnel lens of the present invention.
Figure 8:
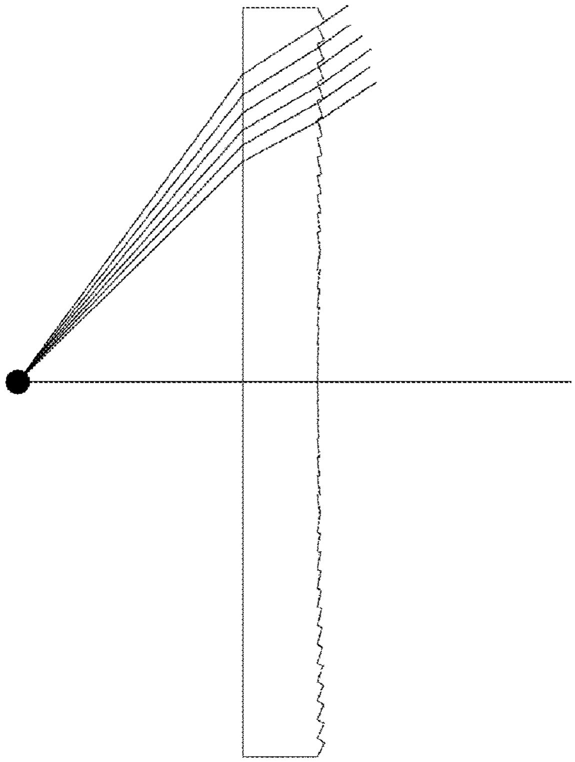

A comparison of the optical path of the Fresnel lens of the present invention and the Fresnel lens of the prior art is given in FIG. 8, wherein FIG. 8(*a*) shows the Fresnel lens of the prior art and FIG. 8(*b*) shows the Fresnel lens of the present invention, and it can be seen by comparison that the Fresnel lens of the present invention is able to reduce the stray light which is refracted towards the upper and lower sides of the lens.

Based on the structural characteristics of the above-mentioned Fresnel lens, the present invention also provides a lamp using the above-mentioned Fresnel lens, including:

A Fresnel lens, comprising a lens body 100, the lens body 100 being provided with a light incident surface 1 and a light exit surface 2 opposite to each other along the first direction D1, and a light source 3, being disposed on the optical axis D0 and provided on a side of the Fresnel lens proximate to the light incident surface 1.

The light emitted from the light source 3 is refracted into the lens body 100 through the light incident surface 1 and then refracted to the outside through the exiting surface 2, on which a number of protruding tooth 21 are arranged adjacent to each other along the second direction D2, the protruding tooth 21 being formed by an effective surface 211 and an ineffective surface 212; the ineffective surface 212 of each of the protruding tooth 21 is formed to form an included angle with the first direction D1, and said included angle is set according to the angle of their adjacent effective surfaces 211 relative to the angle of the second direction D2, and the angle of the light line passing through the adjacent valley point relative to the first direction D1.

As an embodiment of a lamp of the present invention applying the above-described Fresnel lens, said lamp is in the form of an elongate strip, with the light source linearly distributed along the third direction D3, the third direction D3 being perpendicular to the first direction D1 and the second direction D2, and the Fresnel lens being stretched along the third direction D3. The lamp accordingly set up, in any cross-section of the Fresnel lens perpendicular to the third direction D3, the light exit surface 2 of the lens thereof is set up in such a way as to enable the light from the light source 3 on the optical axis D0 to be distributed on the light exit surface 2 as much as possible, and at the same time to reduce the amount of light that passes through the ineffective surface 212, so that a better use effect can be achieved.

The preferred specific embodiments of the present invention have been described in detail above. It should be understood that those skilled in the art can make many modifications and changes according to the concept of the present invention without creative efforts. Therefore, any technical solutions that can be obtained by those skilled in the art through logical analysis, reasoning or limited experiments based on the concept of the present invention and on the basis of the prior art should be within the scope of protection determined by the claims.

The invention claimed is:

1. A Fresnel lens comprising a lens body (100) with a first direction (D1) in a direction in which optical axis (D0) of said lens body (100) is located, said lens body (100) being provided with a light incident surface (1) and a light exit surface (2) opposite to each other along the first direction (D1), and characterized in that in a second direction (D2), which is perpendicular to said first direction (D1), the light exit surface (2) is provided with a plurality of protruding teeth (21) adjacently without gaps, each of said protruding teeth (21) is formed by an effective surface (211) and an ineffective surface (212), wherein said effective surface (211) is adapted to refract light to the outside of the lens body (100), said ineffective surface (212) is defined as a surface that cannot achieve effective refraction, said ineffective surface (212) is provided inclined at an acute angle with respect to said first direction (D1);

for any pair of adjacent first protruding tooth (22) and second protruding tooth (23) on said light exit surface (2), said first protruding tooth (22) comprising a first effective surface (221) and a first ineffective surface (222), said second protruding tooth (23) comprising a second effective surface (231) and a second ineffective surface (232), said first ineffective surface (222) and said second effective surface (231) intersect to form a first valley point (O); a light source (3) is located on the optical axis (D0) and is arranged on a side of the Fresnel lens facing said light incident surface (1), light rays emitted from said light source (3) reach said light incident surface (1) directly;

for a first light ray (L1) emitted from said light source (3) through said light incident surface (1) to reach said first valley point (O), said first light ray (L1) forms a first included angle (α) with respect to said first direction (D1), said second effective surface (231) forms a second included angle (β) with respect to said second direction (D2), said first ineffective surface (222) forms a third included angle (θ) with respect to said first direction (D1), said first light ray (L1) forms a first exiting light ray (L1') after passing through the first valley point (O), and said first exiting light ray (L1') forms a fourth included angle (γ) with respect to said first direction (D1), the magnitude of said third included angle (θ) is set to fall between said first included angle (α) and said fourth included angle (γ): wherein, $$\gamma=\beta+\arcsin[n \sin(\alpha-\beta)]$$

where n is a refractive index of the lens body (100), and n>1.

2. The Fresnel lens according to claim 1, wherein the third included angle (θ) satisfies the following relationship:

$$\theta=\beta+\arcsin[n \sin(\alpha-\beta)].$$

3. The Fresnel lens according to claim 1, characterized in that the third included angle (θ) is equal to the first included angle (α).

4. The Fresnel lens according to claim 1, characterized in that, each protruding tooth (21) on the light exit surface (2) is arranged symmetrically with respect to the optical axis (D0).

5. The Fresnel lens according to claim 1, characterized in that the light incident surface (1) is a planar surface, and the light incident surface (1) is arranged perpendicular to the optical axis (D0).

6. A lamp, comprising:

the Fresnel lens according to claim 1;

said lamp is in the form of an elongate strip extending along a third direction (D3), a plurality of said light sources (3) are linearly distributed along said third direction (D3);

in any cross-section of the Fresnel lens perpendicular to said third direction (D3), the light sources (3) are located on the optical axis (D0) and are arranged on a side of the Fresnel lens facing the light incident surface (1);

said light sources (3) are linearly distributed along a third direction (D3), said third direction (D3) being perpendicular to the first direction (D1) and to the second direction (D2), and said Fresnel lens is stretched along said third direction (D3).

7. The Fresnel lens according to claim 1, characterized in that, along a direction away from the optical axis (D0), the included angles between the effective surface (211) of respective said protruding teeth (21) of the light exit surface (2) relative to the second direction (D2) tapers sequentially along a direction away from the optical axis (D0).

8. The Fresnel lens as claimed in claim 7, characterized in that the angle of the ineffective surface (212) of each of the protrudinq teeth (21) of said light exit surface (2) with respect to said first direction (D1) tapers sequentially along the direction away from the optical axis (D0).

9. The Fresnel lens as claimed in claim 8, characterized in that, along the direction away from the optical axis (D0), included angle between the effective surface (211) of each of the protruding teeth (21) of said light exit surface (2) relative to said second direction (D2) increases in a sequential manner, and included angle between the ineffective surface (212) of each of the protruding teeth (21) of said light exit surface (2) relative to said first direction (D1) increases in a sequential manner.

* * * * *